United States Patent [19]
Matsuo

[11] Patent Number: 5,552,810
[45] Date of Patent: Sep. 3, 1996

[54] RECORDING APPARATUS HAVING HEAD-SHADING FUNCTION AND HEAD-SHADING METHOD

[75] Inventor: Takayuki Matsuo, Yokohama, Japan

[73] Assignee: Canon Kabushiki Kaisha, Tokyo, Japan

[21] Appl. No.: 109,993

[22] Filed: Aug. 23, 1993

[30] Foreign Application Priority Data

Aug. 24, 1992 [JP] Japan ................................. 4-224338
Aug. 17, 1993 [JP] Japan ................................. 5-203221

[51] Int. Cl.⁶ ................................................. B41J 29/393
[52] U.S. Cl. ...................................... 347/19; 358/518
[58] Field of Search ................................. 347/15, 19, 42, 347/43; 358/298, 502, 520, 526, 461, 518

[56] References Cited

U.S. PATENT DOCUMENTS

| | | | |
|---|---|---|---|
| 4,313,124 | 1/1982 | Hara | 347/57 |
| 4,345,262 | 8/1982 | Shirato et al. | 347/10 |
| 4,459,600 | 7/1984 | Sato et al. | 347/47 |
| 4,463,359 | 7/1984 | Ayata et al. | 347/56 |
| 4,558,333 | 12/1985 | Sugitani et al. | 347/65 |
| 4,608,577 | 8/1986 | Hori | 347/66 |
| 4,723,129 | 2/1988 | Endo et al. | 347/56 |
| 4,740,796 | 4/1988 | Endo et al. | 347/56 |
| 5,140,429 | 8/1992 | Ebinuma et al. | 347/23 X |
| 5,353,052 | 10/1994 | Suzuki et al. | 358/298 X |

FOREIGN PATENT DOCUMENTS

| | | |
|---|---|---|
| 54-056847 | 5/1979 | Japan . |
| 59-123670 | 7/1984 | Japan . |
| 59-138461 | 8/1984 | Japan . |
| 60-071260 | 4/1985 | Japan . |

Primary Examiner—John E. Barlow, Jr.
Attorney, Agent, or Firm—Fitzpatrick, Cella, Harper & Scinto

[57] ABSTRACT

A pattern (B) printed by driving only a specific recording element different from a pattern (A) for implementing head-shading is simultaneously formed and the address of density data on the pattern (B) for detecting the position of a recording element in a memory is used to correlate the density data on the pattern (A) for detecting uneven density for each recording element. The implementation of such head-shading and the identification of the position of the recording element of the recording head can thus be carried out with accuracy. As the position of the recording element and the density data thus detected are accurately correlated at all times, improvements in head-shading can be effected accordingly.

56 Claims, 13 Drawing Sheets

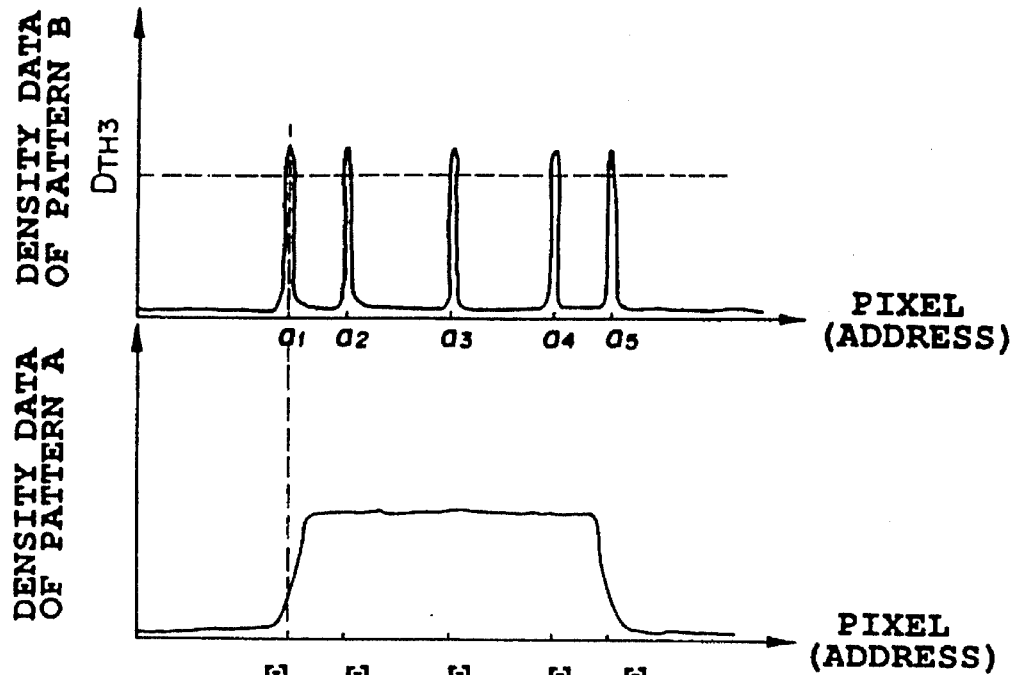
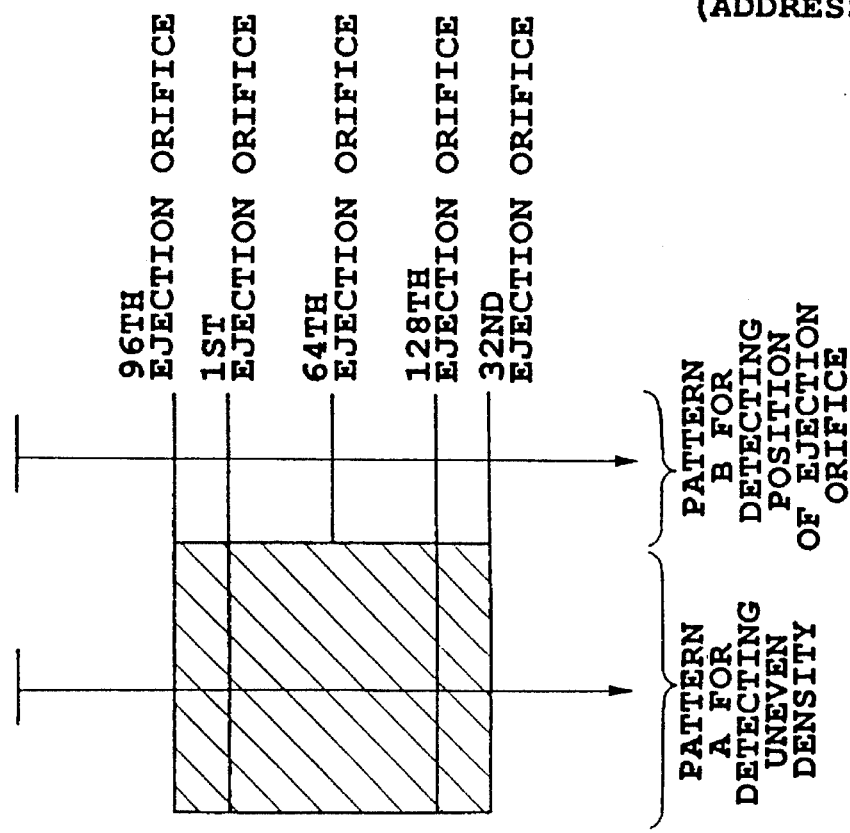

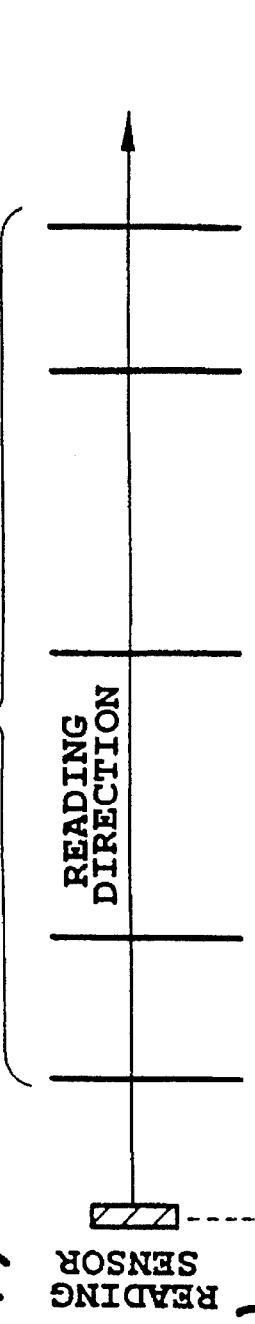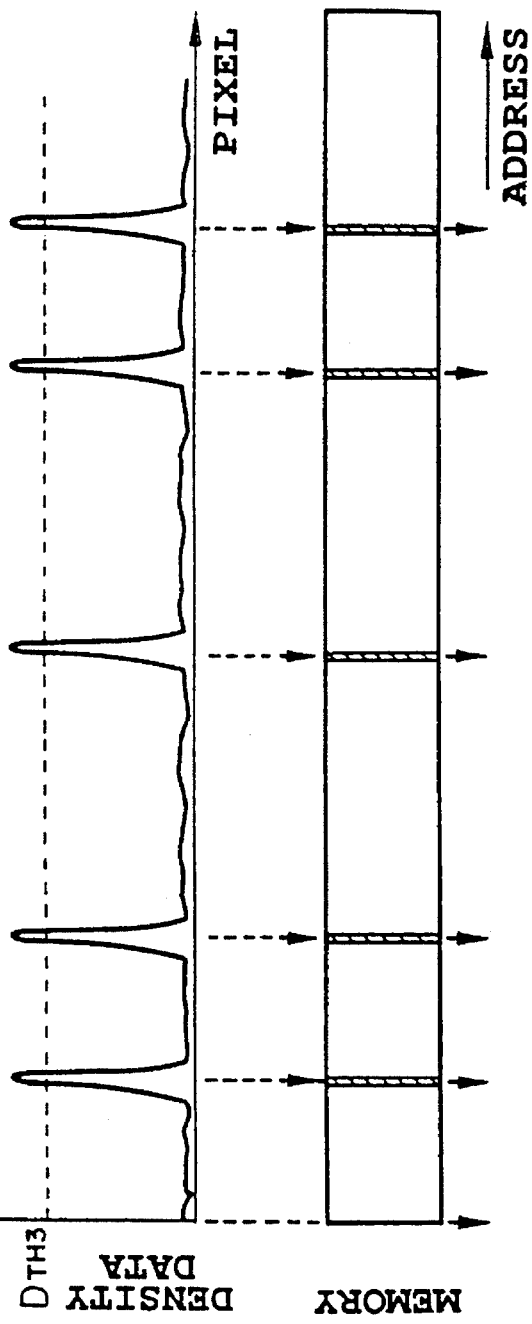
FIG. 12(1)
FIG. 12(2)
FIG. 12(3)

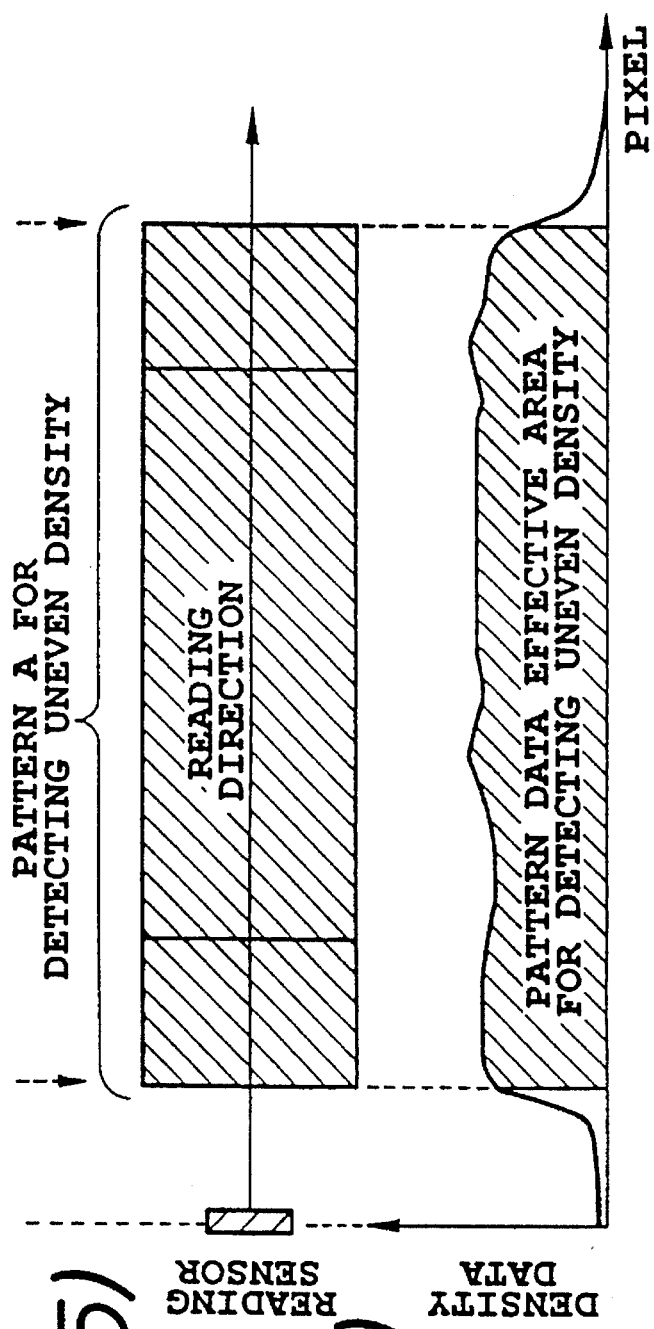

RECORDING APPARATUS HAVING HEAD-SHADING FUNCTION AND HEAD-SHADING METHOD

BACKGROUND OF THE INVENTION

1. Field of the Invention

The present invention relates generally to recording apparatus for forming (recording) images using a recording head having arrays of recording elements and more particularly to a recording apparatus having a head-shading function in determining density data on each recording element of a recording head by detecting the uneven density of a pattern recorded by the recording head to control the output of each recording element according to the density data, and to a head-shading method thereof.

2. Description of the Related Art

With the spread of copying machines, word processors, information processing equipment such as computers, to say nothing of communications equipment, digital image recording apparatuses apparatus employing ink-jet or thermal transfer type recording heads have become widely used as image forming (recording) apparatus for the aforementioned equipment. In such a recording apparatuses, a recording head having arrays of recording elements integrally disposed is generally used for improving recording speed.

For example, the so-called multi-nozzle head which integrally incorporates a plurality of ejection orifices and that of liquid passages is commonly used for the ink-jet recording head. On the other hand, the thermal head such as a thermal transfer head normally has a plurality of heaters integrally arranged.

With respect to the recording heads, there arise difficulties in making uniform the properties of a plurality of recording elements due to variations in the properties thereof and those in head component materials during the process of manufacture. As a result, the recording elements of such recording heads are naturally subject to variations in properties to some degree. For example, ejection orifices and liquid passages of ink-jet recording heads tend to develop variations in shape, whereas heaters of thermal heads are not also free from variations in shape and resistance. In addition to the reasons stated above in view of the limitation of production technology, secular change may also cause element-to-element variations in properties. The lack of uniformity of properties among the recording elements of the recording head results in the unevenness of the size and density of the dot recorded by each recording element and consequently the unevenness of the recorded image.

Such variations in the properties of the recording elements of the recording head (equivalent to unevenness in the amount of ink ejection in the case of an ink-jet recording head, for example) considerably deteriorate recorded image quality. Consequently, attempts have heretofore been made to compensate for the variations in the properties thereof.

A recording apparatus having the following construction has been proposed to implement such attempts. More specifically, the recording apparatus is provided with a recording pattern read unit so that, by periodically reading uneven density in the range of recording element arrays, head-shading data is prepared from the uneven density data.

By taking the ink-jet recording apparatus as an example, the head-shading method will subsequently be described. The recording head of this recording apparatus is designed to eject ink droplets under bubble generating pressure by forming ink bubbles in a plurality of ejection orifices while causing electrothermal transducers fitted in the respective ejection orifices to generate heat. The head is so constituted that it can scan a range corresponding to the length (297 mm) of a short side of a recording medium of A3 size, and is provided with arrays of ejection orifices at a density of 400 dpi (dot per inch), normally 128 of ejection orifices are arranged in a row along the direction met at right angle to the scanning direction of the head. In the case of recording in color, four of the heads thus constructed are employed, these being cyan, magenta, yellow and black heads.

In order to correct the unevenness of ink ejection (unevenness in ink density) from each ejection orifice of the recording head, it has been made a condition that each ink ejection orifice should properly correspond to the recording density data read by a read system.

In the prior art, a predetermined uniform recording signal is used to drive each ejection orifice of a recording head to form a test pattern 2 for detecting uneven density on a recording medium 1 as shown in FIG. 1. The test pattern 2 is formed on a color basis, for example. The test pattern 2 is formed in such a way that, as shown on the left-hand side of FIG. 2, three of upper, middle and lower lines 2a, 2b, 2c are printed from left to right by the head having arrays of ejection orifices arranged in rows. The method of forming the pattern 2 is called irregular 3-line printing. With 128 ejection orifices, for example, the first line 2a is printed by ejecting ink from the 96th up to the last 128th ejection orifices to start with. Subsequently, the second line 2b is printed by ejecting ink from the 1st up to the 128th ejection orifices, that is, all the ejection orifices. The third and last line 2c is printed by ejecting ink from the 1st up to the 32nd ejection orifices.

Thus the test pattern 2 is conventionally formed by sandwiching the second line 2b printed by driving all the ejection orifices of the head between the first and second lines 2a, 2c printed by driving the plurality of ejection orifices in the respective end portions thereof. If the test pattern is formed with only the second line 2b, both ends of the density data for reading will not indicate a clear rise in density because of the light reflected from blank portions near the respect ends of the pattern, thus making it difficult to settle the end positions of the head from the density data. In order to remedy the drawback, the test pattern is formed by the irregular 3-line printing.

An image read system is then used to read the test pattern 2 of certain color thus formed in direction of arrow Y from a read starting position S up to a read terminating position F as shown on the left-hand side of FIG. 2 and density distribution data thus read are temporarily stored in a memory of the apparatus in the order in which the data are read.

Incidentally, the recording density in the ink-jet recording system and the read resolution in the image read system have been set identical, for example, at 400 dpi (dot per inch) in this conventional recording apparatus. For this reason, the ink dot ejected from each ejection orifice corresponds to one pixel in the read system. If the density data stored in the memory is to be expressed by 256 gradations, the printing intensity (density) may be expressed by means of one ejection orifice corresponding to one byte area over the memory. This is because one byte consists of binary 8 bits as is well known and because the number of their combinations comes up to $2^8=256$. Therefore, a section (the number of bytes) of density data well over the threshold level DTH conforms to an ejection section in the direction in which the test pattern is read on condition that the threshold level is properly set.

A section $X_1$ to $X_2$ in a graph on the right-hand side of FIG. 2 represents the section of the aforesaid test pattern. As $X_1$ and $X_2$ are obtainable as address data over the memory, it is possible to obtain addresses at which the density data at the 1st up to 128th ejection orifices are stored by computing the addresses. As a result, the density data may be used to operate on the amount of head-shading.

In the example as noted previously, however, the threshold level ($D_{TH}$) will have to be properly selected to obtain $X_1$ and $X_2$ of FIG. 2. Particularly in the case of the test pattern printed with yellow ink, the density of the color read by the read system is lower than that of any other one and this allows the section of the test pattern to be detected as a section $X_3$ to $X_4$ of FIG. 2 (when the threshold level is at $D_{TH1}$), depending on the way of determining the threshold level ($D_{TH}$). Therefore, the conventional recording apparatus has a drawback in that the ink ejection orifice and the density data will not properly match.

SUMMARY OF THE INVENTION

In view of the foregoing problems, an object of the present invention is to provide a recording apparatus capable of accurately determining the position of each ink ejection orifice corresponding to the uneven density that has been detected and thereby being instrumental in effecting improvements in head-shading performance and to provide a head-shading method thereof.

A recording apparatus having a head-shading function according to the present invention comprises:

means for printing a pattern for detecting uneven density using a recording head, the recording head having a plurality of recording elements arrayed thereon, means for printing a pattern for detecting the position of a recording element correlated with the pattern for detecting uneven density using at least specifically selected one of the recording elements, means for detecting the density of the printed pattern for detecting uneven density and that of the pattern for detecting the position thereof, memory means for temporarily storing density data on the pattern for detecting the position thereof obtained from the detection means, and means for correlating density data on the pattern for detecting uneven density to each of the recording elements according to the address location of the pattern for detecting the position thereof, the pattern for detecting the position being stored in the memory means.

In addition, a head-shading method according to the present invention comprises the steps of:

printing a pattern for detecting uneven density using a recording head, the recording head having a plurality of recording elements arrayed thereon, printing a pattern for detecting the position of a recording element correlated with the pattern for detecting uneven density using at least specifically selected one of the recording elements, reading the printed pattern for detecting the position of a recording element and storing its density data in a memory, detecting the address of a specific recording element within the density data stored in the memory to have the address stored, reading the printed pattern for detecting uneven density, and correlating density data on the pattern for detecting uneven density to each of the recording elements according to the address location of the pattern for detecting the position thereof, the pattern for detecting the position being stored in the memory means.

Further, a method of forming a head-shading pattern according to the present invention comprises the steps of:

printing a pattern for detecting uneven density using a recording head having the recording head a plurality of recording elements arrayed thereon, and printing a pattern for detecting the position of a recording element correlated with the pattern for detecting uneven density using at least specifically selected one of the recording elements.

Further, a method of preparing head-shading data according to the present invention comprises the steps of:

reading a pattern for detecting the position of a recording element, the pattern being formed by the use of at least one recording element of a recording head, and storing its density data in a memory, detecting the address of a specific recording element within the density data stored in the memory to have the address stored, reading a pattern for detecting uneven density, the pattern being formed by the use of all the recording elements of the recording head, and correlating density data on the pattern for detecting uneven density to each of the recording elements according to the address location of the pattern for detecting the position thereof, the pattern for detecting the position being stored in the memory.

Further a recording apparatus according to the present invention having a head-shading function in correcting density data on each recording element by detecting the unevenness of a pattern formed by a recording head having a plurality of recording elements arrayed thereon, the recording apparatus comprising:

means for printing a pattern for detecting uneven density using the plurality of recording elements, means for printing a pattern for detecting the position of a recording element correlated with the pattern for detecting uneven density using at least specifically selected one of the recording elements, means for detecting the density of the printed pattern for detecting uneven density, means for recognizing the position of the specific recording element according to the printed pattern for detecting the position thereof, and means for correlating the density data on the pattern for detecting uneven density and each recording element according to the recognized position of the specific recording element.

Furthermore, a head-shading method according to the present invention comprises the steps of:

printing a pattern for detecting uneven density using a recording head, the recording head having a plurality of recording elements arrayed thereon, printing a pattern for detecting the position of a recording element correlated with the pattern for detecting uneven density using at least specifically selected one of the recording elements, detecting the density of the printed pattern for detecting uneven density, recognizing the position of the specific recording element according to the printed pattern for detecting the position thereof, and correlating the density data on the pattern for detecting uneven density and each recording element according to the recognized position of the specific recording element.

The recording apparatus may further include means for preparing head-shading data according to the density data correlated by the correlating means to each recording element.

The recording apparatus may further include means for correcting the image recorded by the recording head according to the head-shading data prepared by the means for preparing the data.

The recording head may be a head performing recording operations using different colors.

The recording head may be a head ejecting ink.

The recording head may utilize thermal energy for ink ejection.

The recording head may be a head performing recording operations by serial scanning.

The pattern for detecting uneven density may be formed after being scanned a plurality of times by the recording head.

The recording head may have width equal to that of a recording medium.

The specific recording element used for printing the pattern for detecting the position thereof may be singular.

The specific recording element used for printing the pattern for detecting the position thereof may be plural.

The specific recording element may include respective recording elements at both ends of the recording element.

The specific recording element may further include the one located at the center of the recording head.

As set forth above, all the recording elements of the recording head are used to print a test pattern for detecting uneven density first and when the density data on the pattern is made to correspond to the respective recording elements of the head, only the specific recording elements relevant to the test pattern for detecting uneven density is driven to print a test pattern for determining the position of a recording element. Then a read system is used to read the test pattern for determining the position of the recording elements and the density data are stored in the memory and further the test pattern for detecting uneven density is read. It is then based on not only the density distribution data on the test pattern for detecting uneven density but also an address over the memory stored with the density data on the test pattern for determining the position of the ejection orifice to make each recording element correspond to the density data on the test pattern for detecting uneven density. Detecting uneven density as well as determining the position of a recording element can thus be carried out with accuracy.

The above and other objects, effects, features and advantages of the present invention will become more apparent from the following description of embodiments thereof taken in conjunction with the accompanying drawings.

BRIEF DESCRIPTION OF THE DRAWINGS

FIG. 7(c) is a plan view showing the direction in which the detection pattern of FIG. 6 is read read, and FIGS. 7(A) and 7(B) are graphs (A) (B) showing the relation between the level of density data on the uneven density pattern thus read or that of density data on the pattern of the ejection orifice position and an address over a memory;

FIGS. 12(1)–12(6) depict a graph explanatory of the principle of the present invention and which show the relation among the physical position of the pattern for detecting the position of an ejection orifice/pattern for detecting uneven density, the data storage position in the memory and the density data.

DETAILED DESCRIPTION OF PREFERRED EMBODIMENTS

Referring to the accompanying drawings, preferred embodiments of the present invention will subsequently be described in detail.

Figure 1:
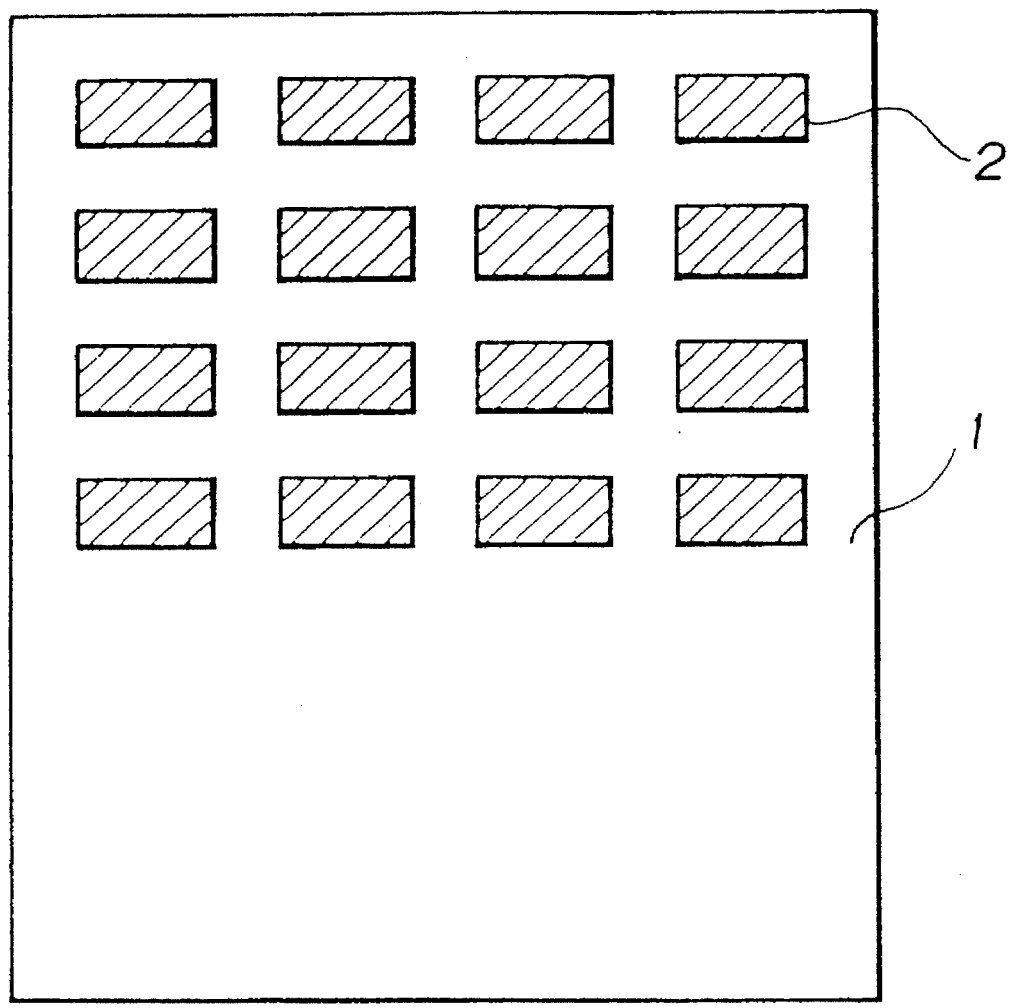
FIG. 1 is a test chart illustrating conventional printed patterns for detecting uneven density.
Figure 2:
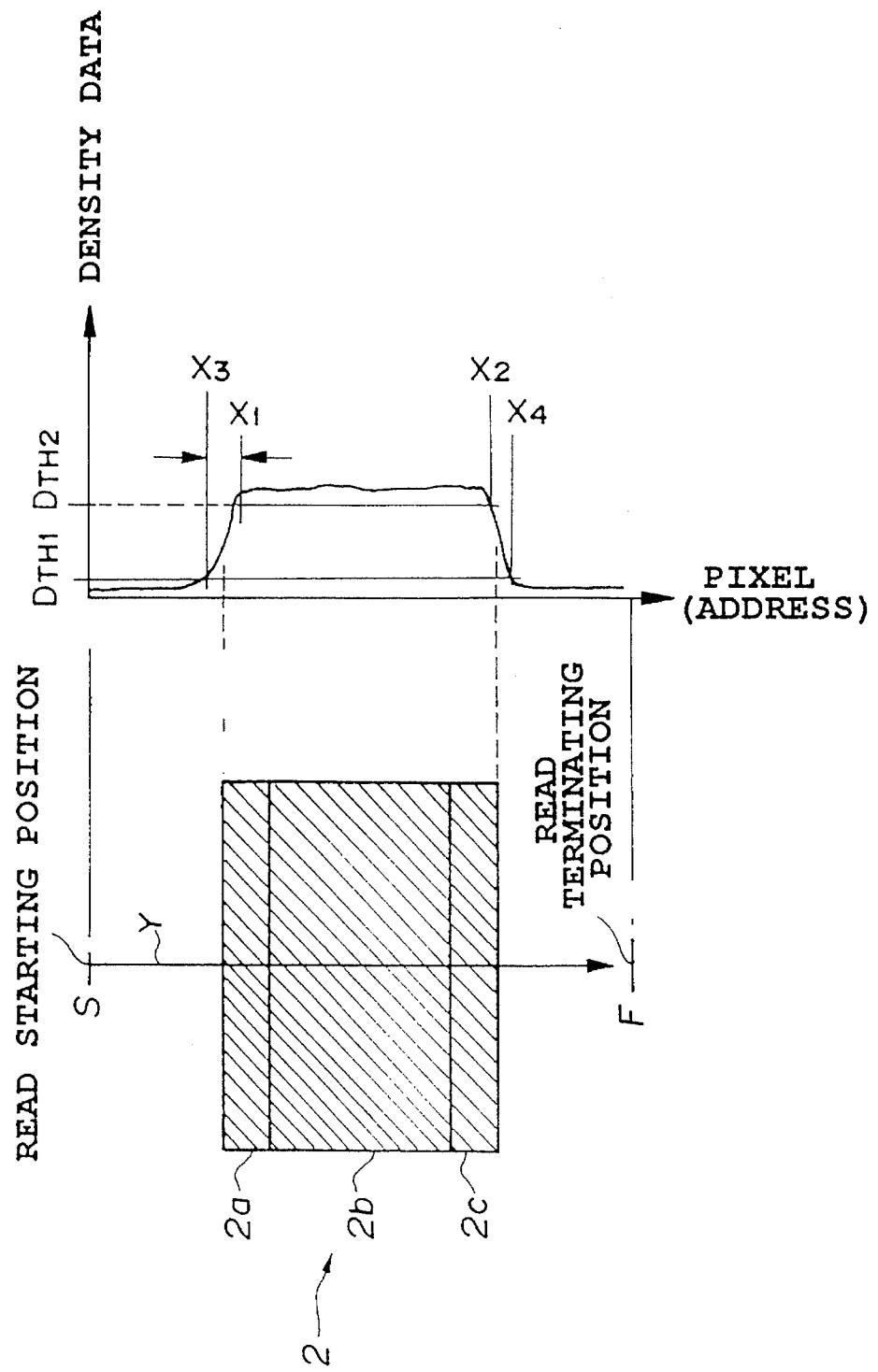
FIG. 2 is a diagram indicating the direction in which the pattern for detecting uneven density of FIG. 1 is read together with a graph showing the relation between the level of the density data thus read and an address over a memory.
Figure 3:
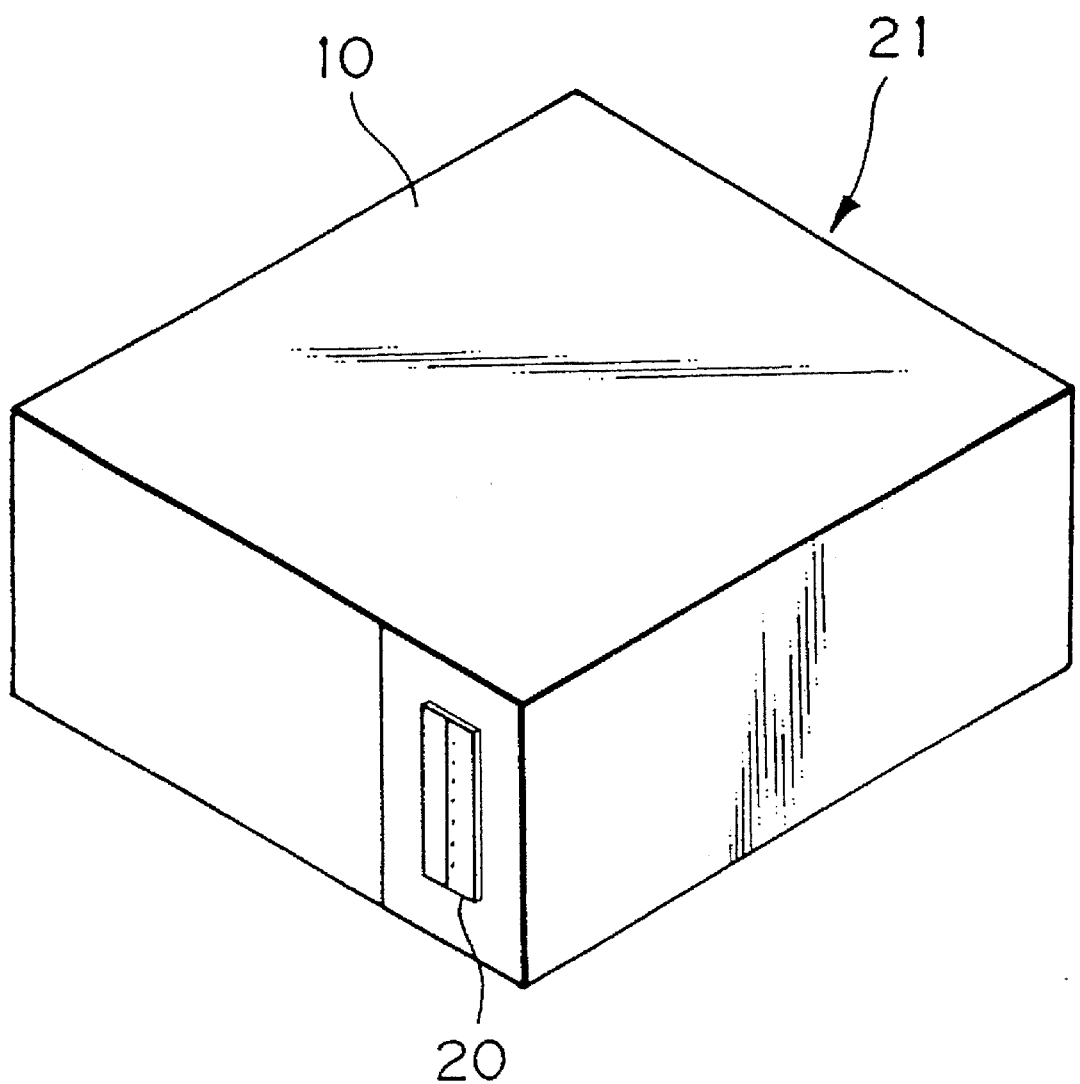
FIG. 3 is a perspective view showing an exemplary construction of a recording head of an ink-jet recording apparatus to which the present invention is applied.

FIG. 3 shows an exemplary construction of a recording head of an ink-jet recording apparatus to which the present invention is applied. In FIG. 3, numeral 20 denotes an ink-jet head (recording head) in such a system as to eject ink on recording paper using the bubbles produced by thermal energy. The head 20 is integrally fitted to an ink tank 10. The head 20 and the ink tank 10 in combination constitute an ink-jet head cartridge 21, which is detachably fitted to the recording apparatus.

As shown in the perspective view of FIG. 3, the ink-jet head cartridge 21 is equipped with the ink-jet head 20 whose nose slightly protrudes from the front panel of the ink tank 10. This cartridge 21 is of a replaceable type and arranged so that it may be detachably secured to and supported by the carriage mounted on an ink-jet recording apparatus proper IJRA as will be described later.

The ink tank 10 storing ink to be supplied to the ink-jet head 20 is provided with an ink absorbing material, a container for receiving the ink absorbing material and a lid member for sealing the lid member (these being not shown). The ink tank 10 is filled with ink, which is successively supplied toward the head 20 as the ink is ejected.

The ink-jet head cartridge 21 thus constructed is detachably mounted on the carriage of the ink-jet recording apparatus IJRA, which will be described below, through a predetermined method, whereby a desired recording image is formed by controlling the relative movements of the carriage and a recording member when a predetermined recording signal is applied.

Figure 4:
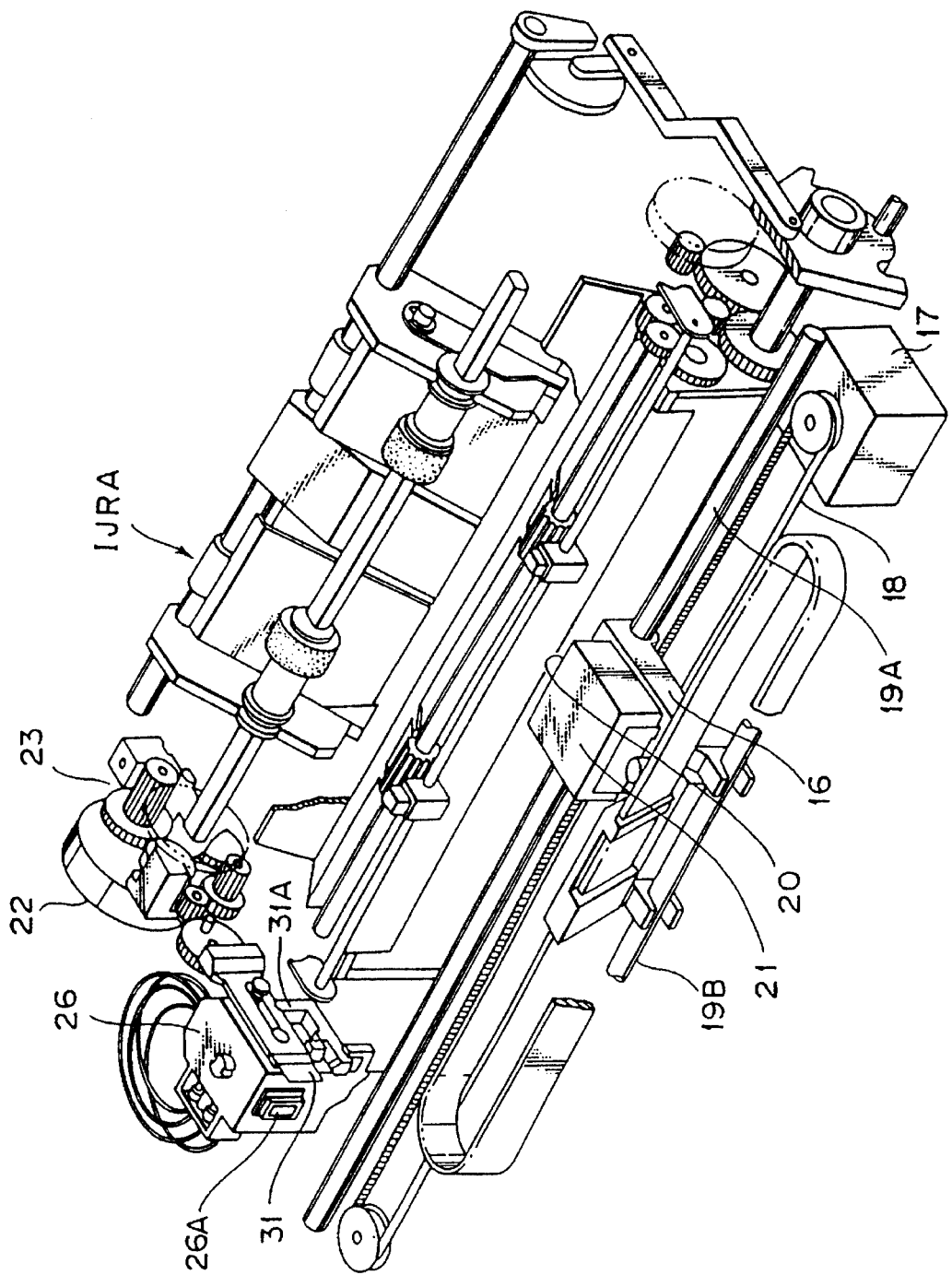
FIG. 4 is a perspective view showing the principal parts of the ink-jet recording apparatus fitted with the recording head of FIG. 3.

FIG. 4 is an external perspective view showing the exemplary ink-jet recording apparatus IJRA equipped with a mechanism for processing head-shading as noted above.

In FIG. 4, numeral 16 denotes a carriage for holding the recording head 20. The carriage 16 is coupled to part of a drive belt 18 for transmitting the torque of a drive motor 17 and slidably fitted to two parallel guide shafts 19A, 19B. Consequently, the recording head 20 is allowed to reciprocate freely over the whole breadth of recording paper. During the reciprocating motion, the recording head 20 records an image on the recording paper according to the data received. Each time the head 20 completes the recording operation by scanning (main scanning) once, the recording paper is moved (for sub-scanning) by a predetermined amount in a direction perpendicular to the main scanning.

Numeral 26 in FIG. 4 denotes a head recovery unit, which is arranged at one end of the moving route of the recording head 20 or at a position opposite to its home position, for example. The head recovery unit 26 is driven by a motor 22 via a transmission mechanism 23 to do the capping of the recording head 20. The head recovery unit 26 has a cap portion 26A and performs a sucking operation (suction recovery) using a proper suction means (e.g., suction pump) provided in the head recovery unit 26 after fitting the cap portion 26A with the recording head 20. With the sucking operation, ink is forced to eject from each ejection orifice of the head 20 so as to effect an ejection recovering operation by removing viscosity-increased ink present in each ejection orifice of the head 20 and other substances such as dust sticking to the periphery of each ejection orifice thereof. In a case where no recording operation is performed for a relatively long period of time after the termination of recording, for example, the cap portion 26A is used to provide capping for the head 20, which is prevented from being excessively dried and also protected from the sticking of dust and the like thereto. The ejection recovery operation is conducted at the time power is supplied or the recording head is replaced or no recording operation is performed for a certain long period of time.

Numeral 31 denotes a blade as a wiping member made of silicone rubber and disposed on the side of the head recovery unit 26. The blade 31 is held by a blade holding member 31A in the form of a cantilever and, like the head recovery unit 26, operated by the motor 22 and the transmission mechanism 23 to make slidable contact with the ejection surface of the recording head 20. By projecting the blade 31 over the moving route of the recording head 20 at appropriate timing during the recording operation of the recording head 20 and after the ejection restoring operation by means of the head recovery unit 26, substances such as dew condensation, wetness, dust and the like sticking to the ejection surface can be wiped off while the blade 31 is rubbing itself against the ejection surface of the moving head 20.

Although a description has been given of the monochromatic recording apparatus fitted with only one ink-jet head cartridge 20 in FIG. 4 for the purpose of simplifying the description of the invention, a multi-color recording apparatus is basically similar in construction to the former except for the provision of four ink-jet head cartridges for cyan, magenta, yellow and black.

Figure 5:
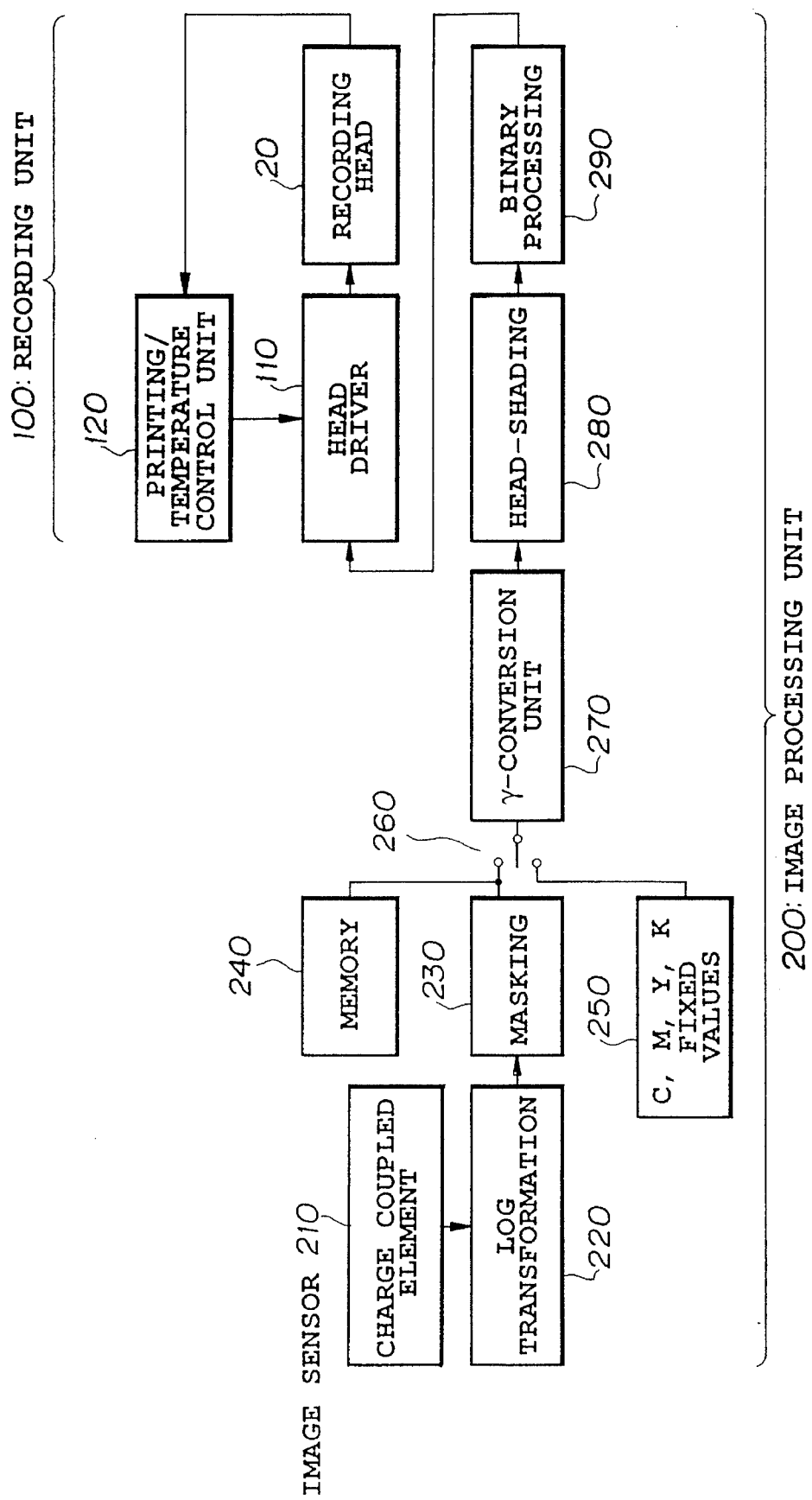
FIG. 5 is a block diagram illustrating circuit arrangements in the read and recording systems of an ink-jet recording apparatus to which the present invention is applied.

FIG. 5 is a block diagram illustrating a circuit arrangement in the read and recording systems of an ink-jet recording apparatus to which the present invention is applied. A recording unit 100 in this case comprises the recording head 20, a head driver 110 for supplying to a heating medium in each ejection orifice a regulating signal for constantly heating the recording head 20 at a predetermined temperature and an ejection pulse for causing ink to be ejected, and a printing/temperature control unit 120 for regulating the temperature regulating signal and the width of the ejection pulse produced from the head driver 110 so as to maintain the recording head 20 at the predetermined temperature on receiving temperature data from a temperature sensor (not shown) in the head 20. The control unit 120 controls printing sections on a printing color basis.

Figure 6:
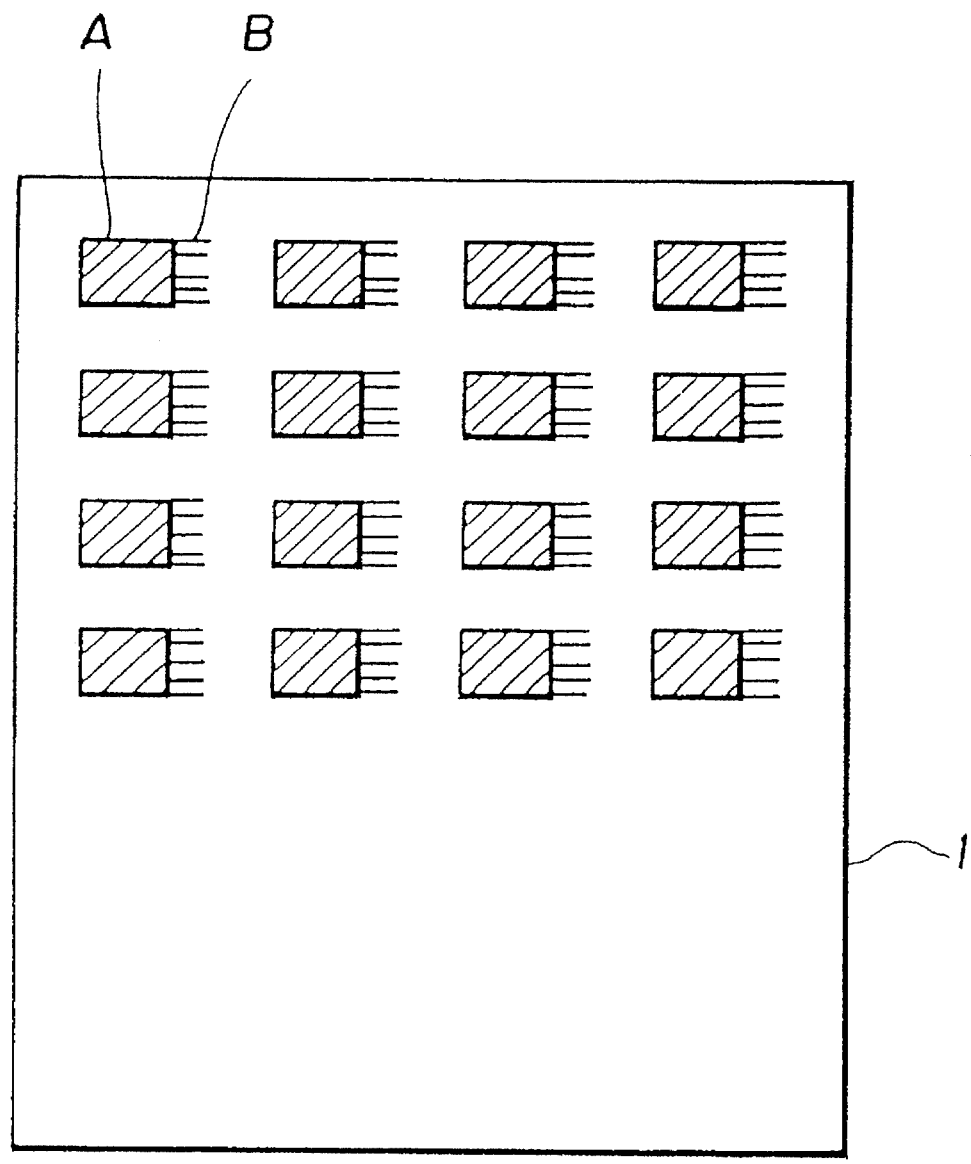
FIG. 6 is a test chart illustrating patterns for detecting uneven density and patterns for detecting the position of an ejection orifice embodying the present invention.

Image data to be fed to the recording unit 100 is in the form of a binary signal indicating whether or not ink is ejected from each ink ejection orifice. When the binary image data is applied to the head driver 110 controlled by the printing/temperature control unit 120, ink is ejected from the corresponding ejection orifices of the recording head 20. Moreover, it is possible for ink to be ejected from a specific ejection orifice without the application of the image data. In other words, ink may be ejected from the specific ejection orifice by applying a heating pulse from the head driver 110 to that ejection orifice as instructed by the control unit 120 longer than the normal temperature regulating time. The printing of the aforesaid test pattern for detecting the position of an ejection orifice (called a chart) is carried out in this ejection method; that is, ink is caused to be ejected from only the specific ejection orifice of the head 20 according to a drive signal from the printing/temperature control unit 120 of the recording unit 100 so as to print a linear chart B for detecting the position of an ejection orifice shown on the right-hand side of a pattern A for detecting uneven density as shown in FIG. 6 as will be referred to below. The printing of the pattern A for detecting uneven density is carried out by feeding fixed values (80H) 250 of cyan, magenta, yellow and black to a conversion unit 270 in an image processing unit 200 and the printed pattern is recorded as a halftone pattern.

FIG. 6 shows an example of the head-shading test pattern formed on recording paper 1, wherein four patterns for cyan, magenta, yellow and black, namely, 16 patterns in total, constitute the chart. Each pattern is arranged as shown on the left-hand side of FIG. 7; more specifically, that pattern includes the test pattern A for detecting uneven density printed by ejecting ink from all the ejection orifices of the recording head 20 as in the prior art and the test pattern B for detecting the position of an ejection orifice printed by ejecting ink from the 96th, 1st, 64th, 128th and 32nd ejection orifices of the recording head 20. In this case, these patterns A, B are formed through the irregular 3-line printing method.

A description will subsequently be given of the essential point of the present invention in the form of a method of making each ejection orifice correspond to the density data on the test pattern A for detecting uneven density on the basis of the test pattern A for detecting uneven density as well as the test pattern for detecting the position of an ejection orifice. However, the description of any other steps than what is taken to effect the coordination above in the head-shading process will be omitted as they do not constitute the essential point of the present invention and besides are already well known.

Referring to FIGS. 7(A)–7(C), the pattern B for detecting the position of an ejection orifice on the right-hand side of the pattern A is read by an image sensor (charge coupled device) 210 of FIG. 5. A graph of FIG. 7(B) shows the relation between the level of the density data thus read and an address in a memory 240. The density data read by the sensor 210 appears to have a waveform including five peaks since the pattern B for detecting the position of an ejection orifice is printed by using five ejection orifices as noted previously.

As shown in the graph of FIG. 7(B), the density data obtained by reading the pattern B for detecting the position of an ejection orifice and stored in the memory 240 is retrieved from the low order address over the memory 240. Subsequently, the memory 240 is made to store the address at which density data exceeds a predetermined threshold level $D_{TH3}$. The addresses a1 to a5 stored like this correspond to the density data on the 96th, 1st, 64th, 128th and 32nd ejection orifices in order.

Of the density data stored in the memory 240 by reading the pattern A for detecting uneven density from the image sensor 210, the density data at the same address as a2 of the 1st ejection orifice that has already been stored is adopted as the density data of the 1st ejection orifice of the pattern A for detecting uneven density.

Since the pattern B for detecting the position of an ejection orifice has been formed by causing only the specific ejection orifice to eject ink, it remains unaffected by the ink ejected from any adjacent ejection orifices. Moreover, unlike the pattern A for detecting uneven density with 50% density halftone, not only ejection density but also printing intensity is relatively high because ink ejection is implemented by directly controlling the head driver 110. Therefore, the peak position, that is, the threshold level for fixing the position of the ejection orifice can be set high with respect to the density data on the pattern B and any inclined portion of the density data can also be avoided to ensure that an accurate position is specified.

Since five ejection orifices are employed in the pattern B, even though any one of them fails to eject ink, the address at which the data on the 1st ejection orifice is easily obtainable by calculation from the addresses at which the density data on the remaining ejection orifices are stored. Assuming that the specific ejection orifice never fail to eject ink, it is satisfactory for making the pattern for detecting the position of an ejection orifice to use at least one ejection orifice as the specific ejection orifice After corresponding the addresses to the density data in the head-shading process, a data for correcting uneven density, namely an HS data, is calculated, and the head-shading process is completed. Then, an image information or a driving signal is corrected according to the HS data, and an image free from uneven density is recorded.

Referring to flowcharts of FIGS. 8–11 and a graph of FIG. 12, a detailed description of the head-shading process will subsequently be given.

Figure 8:
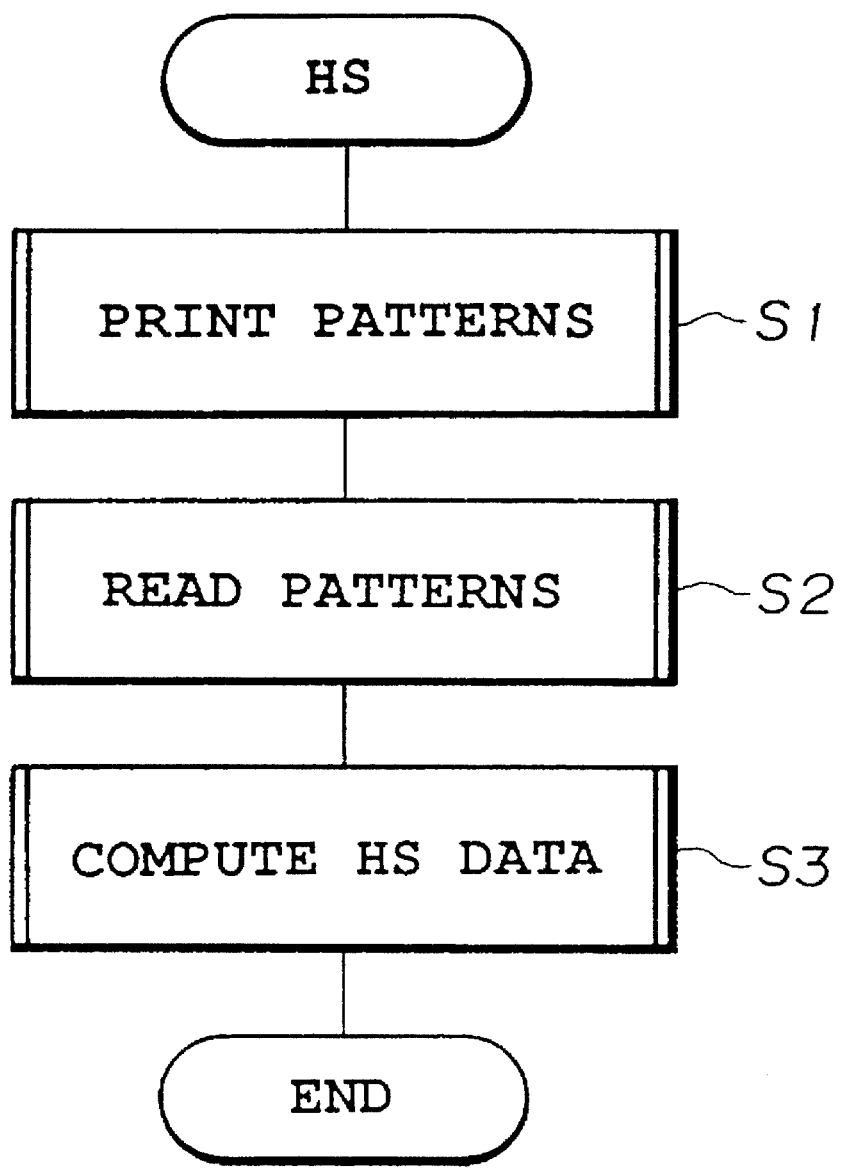
FIG. 8 is a schematic flowchart illustrating head-shading to be conducted according to the present invention.

FIG. 8 shows a general flowchart of head-shading. At Step 1, the pattern for detecting uneven density and the pattern for detecting the position of an ejection orifice featuring this embodiment are printed. At Step 2, the patterns thus printed are read to make the density data correspond to each ejection orifice. At Step 3, HS data is computed. Then the recording head is used to record an image free from uneven density according to the HS data during the normal recording operation.

Figure 9:
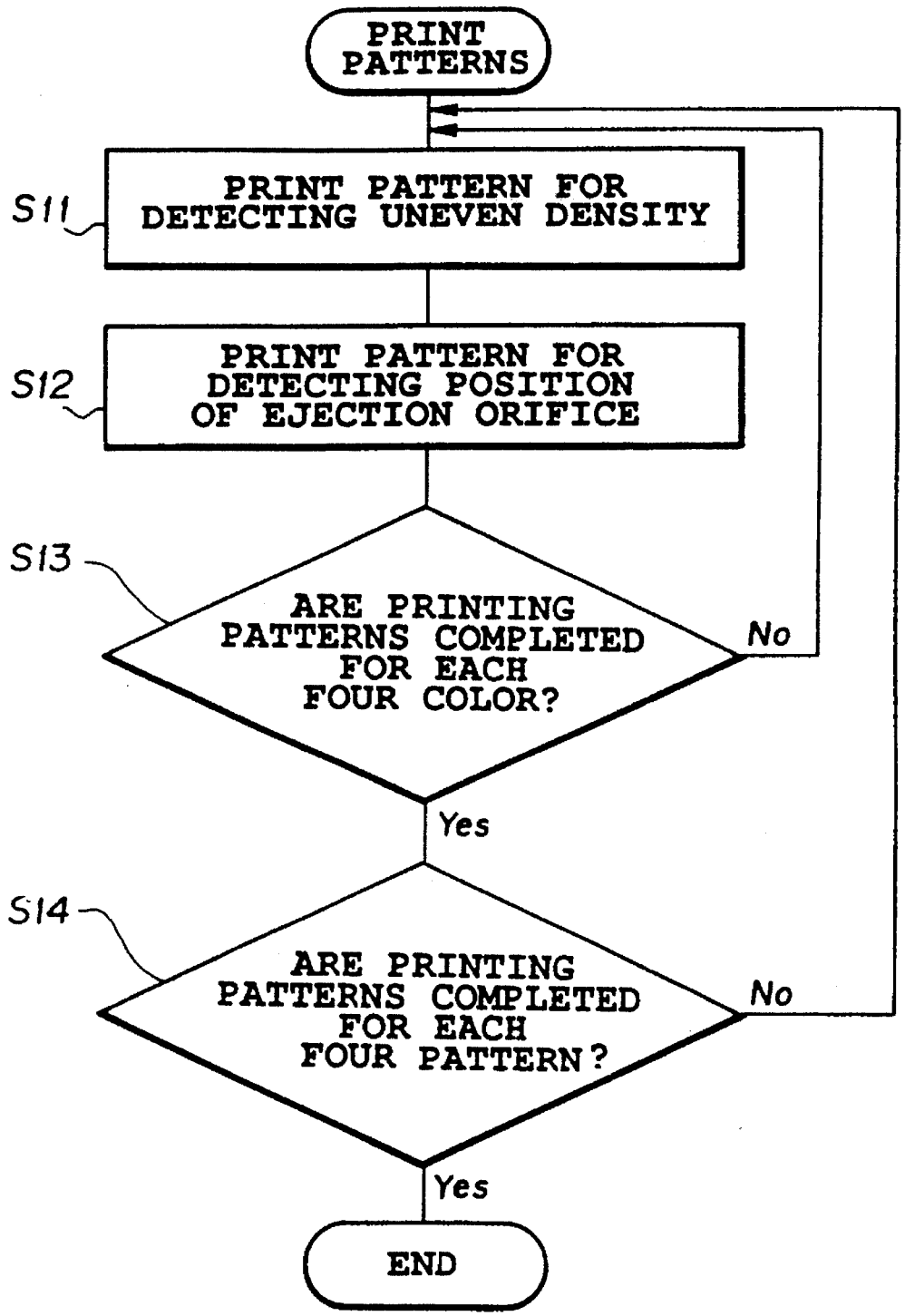
FIG. 9 is a flowchart illustrating a test pattern printing routine in the head-shading being conducted according to the present invention.

FIG. 9 shows a flowchart of a pattern printing routine for indicating the contents of Step 1 in detail. The pattern for detecting uneven density (FIGS. 6, 7, 12) is printed at Step 11 and the pattern for detecting the position of an ejection orifice (FIGS. 6, 7, 12) is printed at Step 12. At Steps 13, 14, the printing of the patterns shown in FIG. 6 is completed after repeating the these process steps four color times and four pattern times.

Figure 10:
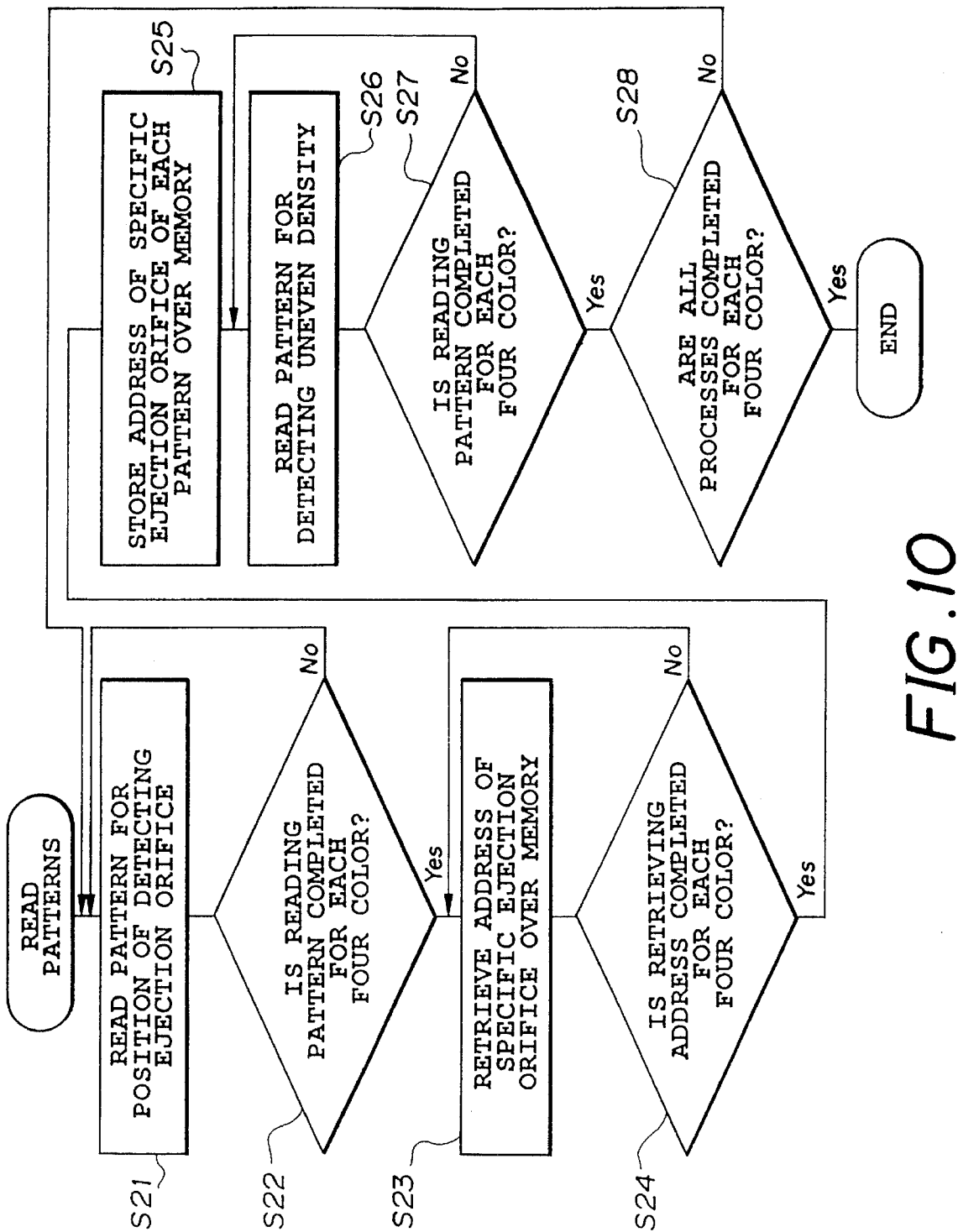
FIG. 10 is a flowchart illustrating a test pattern reading routine in the head-shading being conducted according to the present invention.

FIG. 10 shows a flowchart of a pattern read routine indicating the contents of Step 2 in detail. At Step 21, the pattern B for detecting the position of an ejection orifice (FIG. 12(1)) is read and the result is stored in the memory as density data (FIG. 12(2) (3)). At Step 22, these process steps are repeated four pattern times. As noted previously, the density data indicates five peaks corresponding to the specific ejection orifice.

At Steps 23, 24, the address of the specific ejection orifice over the memory is retrieved four pattern times and the address thus retrieved is stored in the memory at Step 25 (FIG. 12(4)). The specific ejection orifice is detected as an address at which density data exceeding the threshold level $D_{TH}$ is stored.

Subsequently at Steps 26, 27, the pattern A for detecting uneven density is read four pattern times and the results are stored in the memory (FIG. 12(5)). At Step 28, the routine is terminated after repeating these process steps four color times and reading the results.

Figure 11:
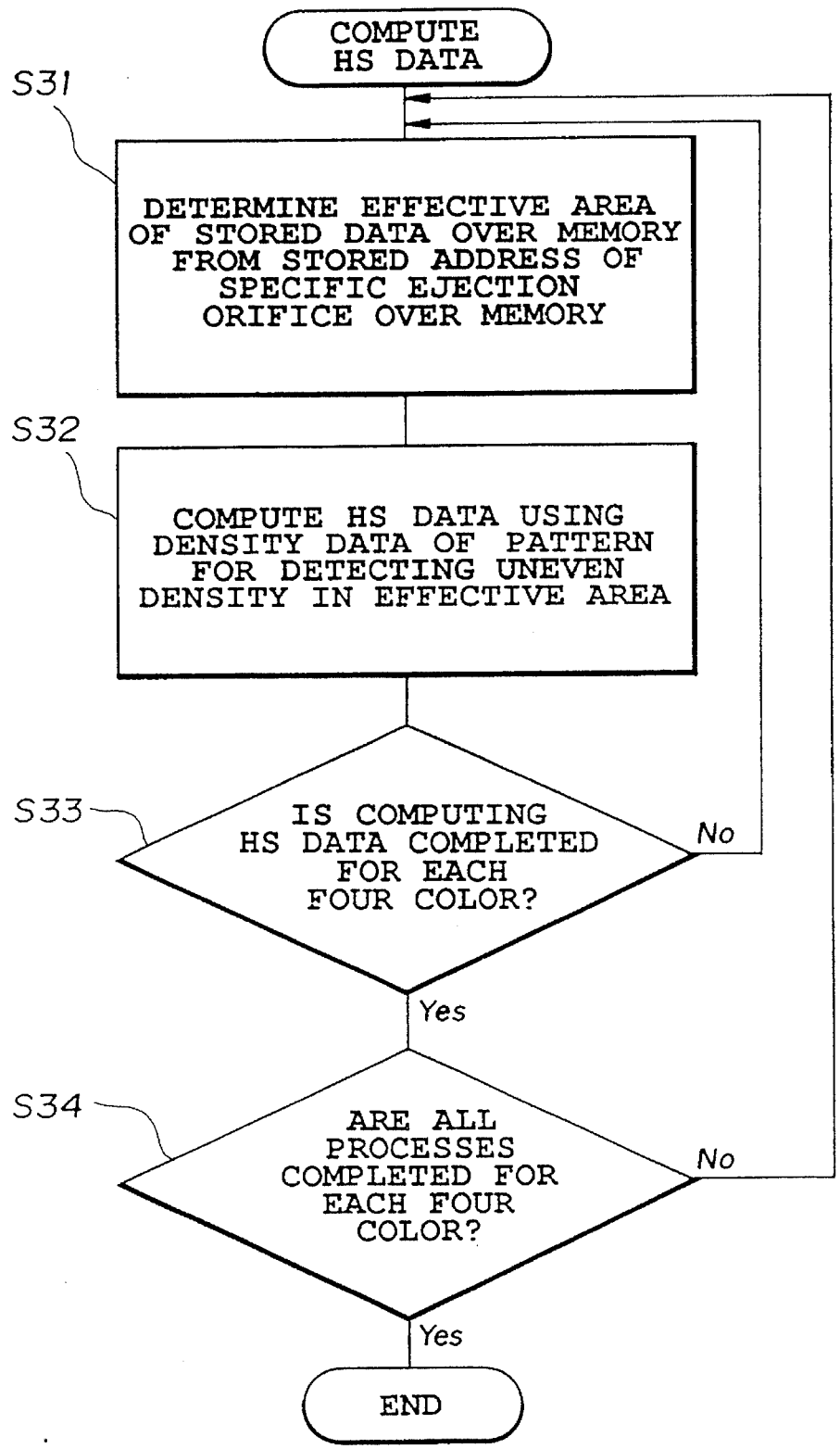
FIG. 11 is a flowchart illustrating a correction data preparing routine from test pattern reading density data in the head-shading being conducted according to the present invention.

FIG. 11 shows a flowchart of an HS data computing routine indicating the contents of Step 3 in detail. At Step 31, an effective area of the stored data over the memory is determined from the stored address of the specific ejection orifice over the memory at Step 25, the data being obtained by reading the pattern for detecting uneven density at Step 26 (FIG. 12(6)). The density data and each ejection orifice are thus coordinated.

At Step 32, the HS data is computed using the density data of the pattern for detecting uneven density in the effective area. At Steps 33, 34, the computing routine is terminated after repeating these process steps four pattern times and four color times. Although the HS data is computed four pattern times per color in this case, the density data may be averaged to obtain the HS data for use in head-shading or otherwise the most frequent value may be employed.

As the density data on the pattern for detecting uneven density and each ejection orifice are accurately coordinated through the head-shading process, proper head-shading data (HS data) can be computed. Therefore, it is possible to record an image free from uneven density.

The present invention achieves a distinct effect when applied to a recording head or a recording apparatus which has means for generating thermal energy such as electro-thermal transducers or laser light, and which causes changes in ink by the thermal energy so as to eject ink. This is because such a system can achieve a high density and high resolution recording.

A typical structure and operational principle thereof is disclosed in U.S. Pat. Nos. 4,723,129 and 4,740,796, and it is preferable to use this basic principle to implement such a system. Although this system can be applied either to on-demand type or continuous type ink jet recording systems, it is particularly suitable for the on-demand type apparatus. This is because the on-demand type apparatus has electrothermal transducers, each disposed on a sheet or liquid passage that retains liquid (ink), and operates as follows: first, one or more drive signals are applied to the electrothermal transducers to cause thermal energy corresponding to recording information; second, the thermal energy induces sudden temperature rise that exceeds the nucleate boiling so as to cause the film boiling on heating portions of the recording head; and third, bubbles are grown in the liquid (ink) corresponding to the drive signals. By using the growth and collapse of the bubbles, the ink is expelled from at least one of the ink ejection orifices of the head to form one or more ink drops. The drive signal in the form of a pulse is preferable because the growth and collapse of the bubbles can be achieved instantaneously and suitably by this form of drive signal. As a drive signal in the form of a pulse, those described in U.S. Pat. Nos. 4,463,359 and 4,345,262 are preferable. In addition, it is preferable that the rate of temperature rise of the heating portions described in U.S. Pat. No. 4,313,124 be adopted to achieve better recording.

U.S. Pat. Nos. 4,558,333 and 4,459,600 disclose the following structure of a recording head, which is incorporated to the present invention: this structure includes heating portions disposed on bent portions in addition to a combination of the ejection orifices, liquid passages and the electrothermal transducers disclosed in the above patents. Moreover, the present invention can be applied to structures disclosed in Japanese Patent Application Laying-open Nos. 123670/1984 and 138461/1984 in order to achieve similar effects. The former discloses a structure in which a slit common to all the electrothermal transducers is used as ejection orifices of the electrothermal transducers, and the latter discloses a structure in which openings for absorbing pressure waves caused by thermal energy are formed corresponding to the ejection orifices. Thus, irrespective of the type of the recording head, the present invention can achieve recording positively and effectively.

The present invention can be also applied to a so-called full-line type recording head whose length equals the maximum length across a recording medium. Such a recording head may consist of a plurality of recording heads combined together, or one integrally arranged recording head.

In addition, the present invention can be applied to various serial type recording heads: a recording head fixed to the main assembly of a recording apparatus; a conveniently replaceable chip type recording head which, when loaded on the main assembly of a recording apparatus, is electrically connected to the main assembly, and is supplied with ink therefrom; and a cartridge type recording head integrally including an ink reservoir.

It is further preferable to add a recovery system, or a preliminary auxiliary system for a recording head as a constituent of the recording apparatus because they serve to make the effect of the present invention more reliable. Example of the recovery system are a capping means and a cleaning means for the recording head, and a pressure or suction means for the recording head. Examples of the preliminary auxiliary system are a preliminary heating means utilizing electrothermal transducers or a combination of other heater elements and the electrothermal transducers, and a means for carrying out preliminary ejection of ink independently of the ejection for recording. These systems are effective for reliable recording.

The number and type of recording heads to be mounted on a recording apparatus can be also changed. For example, only one recording head corresponding to a single color ink, or a plurality of recording heads corresponding to a plurality of inks different in color or concentration can be used. In other words, the present invention can be effectively applied to an apparatus having at least one of the monochromatic, multi-color and full-color modes. Here, the monochromatic mode performs recording by using only one major color such as black. The multi-color mode carries out recording by using different colorinks, and the full-color mode performs recording by color mixing.

Furthermore, although the above-described embodiments use liquid ink, inks that are liquid when the recording signal is applied can be used: for example, inks can be employed that solidify at a temperature lower than the room temperature and are softened or liquefied in the room temperature. This is because in the ink jet system, the ink is generally temperature adjusted in a range of 30° C.–70° C. so that the viscosity of the ink is maintained at such a value that the ink can be ejected reliably.

In addition, the present invention can be applied to such apparatus where the ink is liquefied just before the ejection by the thermal energy as follows so that the ink is expelled from the orifices in the liquid state, and then begins to solidify on hitting the recording medium, thereby preventing the ink evaporation: the ink is transformed from solid to liquid state by positively utilizing the thermal energy which would otherwise cause the temperature rise; or the ink, which is dry when left in air, is liquefied in response to the thermal energy of the recording signal. In such cases, the ink may be retained in recesses or through holes formed in a porous sheet as liquid or solid substances so that the ink faces the electrothermal transducers as described in Japanese Patent Application Laying-open Nos. 56847/1979 or 71260/1985. The present invention is most effective when it uses the film boiling phenomenon to expel the ink.

Furthermore, the ink jet recording apparatus of the present invention can be employed not only as an image output terminal of an information processing device such as a computer, but also as an output device of a copying machine including a reader, and as an output device of a facsimile apparatus having a transmission and receiving function.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

As set forth above, the head-shading method according to the present invention comprises the steps of printing the pattern for special use in determining the position of the recording element of the recording head, storing the address over the memory at which the density data obtained by the pattern thus printed is stored, and correlating the number of the recording element of the density data obtained by reading the pattern for detecting uneven density to the address that has been stored, whereby the detection of uneven density and the identification of the position of the recording element can be made with accuracy. Therefore, the present invention is effective in not only increasing the performance of head-shading but also improving head-shading convergence.

The present invention has been described in detail with respect to preferred embodiments, and it will now apparent that changes and modifications may be made without departing from the intention in its broader aspects, and it is the invention, therefore, in the appended claims to cover all such changes and modifications as fall within the true spirit of the invention.

What is claimed is:

1. A recording apparatus having a head-shading function comprising:

means for printing a pattern for detecting uneven density using a recording head, the recording head having a plurality of recording elements arrayed thereon, means for printing a pattern for detecting the positions of the recording elements correlated with the pattern for detecting uneven density using at least one specifically selected recording element of the recording elements, means for detecting the density of the printed pattern for detecting uneven density and the density of the pattern for detecting the positions, memory means for temporarily storing density data on the pattern for detecting the positions obtained from the detection means, and means for correlating density data on the pattern for detecting uneven density with each of the recording elements according to the address location of the pattern for detecting the positions, the pattern for detecting the positions being stored in the memory means.

2. A recording apparatus according to claim 1, further comprising means for preparing head-shading data according to the density data correlated by the correlating means to each of the recording elements.

3. A recording apparatus according to claim 2, further comprising means for correcting an image recorded by the recording head according to the head-shading data prepared by the means for preparing the data.

4. A recording apparatus according to claim 1, wherein the recording head comprises a head for performing recording operations using different colors.

5. A recording apparatus according to claim 1, wherein the recording head comprises a head for ejecting ink.

6. A recording apparatus according to claim 5, wherein the recording head utilizes thermal energy for ink ejection.

7. A recording apparatus according to claim 1, wherein the recording head comprises a head for performing recording operations by serial scanning.

8. A recording apparatus according to claim 7, wherein the pattern for detecting uneven density is formed after being scanned a plurality of times by the recording head.

9. A recording apparatus according to claim 1, wherein the recording head has a width equal to that of a recording medium.

10. A recording apparatus according to claim 1, wherein the at least one specific recording element used for printing the pattern for detecting the position is singular.

11. A recording apparatus according to claim 1, wherein the at least one specific recording element used for printing the pattern for detecting the position is plural.

12. A recording apparatus according to claim 11, wherein the at least one specific recording element includes respective recording elements at both ends of the recording head.

13. A recording apparatus according to claim 12, wherein the at least one specific recording element further includes a recording element located at the center of the recording head.

14. A head-shading method comprising the steps of:

printing a pattern for detecting uneven density using a recording head, the recording head having a plurality of recording elements arrayed thereon, printing a pattern for detecting the positions of the recording elements correlated with the pattern for detecting uneven density using at least one specifically selected recording element of the recording elements, reading the printed pattern for detecting the positions of the recording elements and storing density data of the pattern for detecting the positions in a memory, detecting the address of the specifically selected recording element within the density data stored in the memory to have the address stored, reading the printed pattern for detecting uneven density, and correlating density data on the pattern for detecting uneven density to each of the recording elements according to the address location of the pattern for detecting the positions.

15. A head-shading method according to claim 14, further comprising the step of preparing head-shading data according to the density data correlated the correlating step with to each recording element.

16. A head-shading method according to claim 15, further comprising the step of correcting an image recorded by the recording head according to the head-shading data prepared in the steps of preparing the data.

17. A head-shading method according to claim 14, wherein the recording head performs recording operations using different colors.

18. A head-shading method according to claim 14, wherein the recording head ejects ink.

19. A head-shading method according to claim 18, wherein the recording head utilizes thermal energy for ink ejection.

20. A head-shading method according to claim 14, wherein the recording head performs recording operations by serial scanning.

21. A head-shading method according to claim 20, wherein the pattern for detecting uneven density is formed after being scanned a plurality of times by the recording head.

22. A head-shading method according to claim 14, wherein the recording head has a width equal to that of a recording medium.

23. A head-shading method according to claim 14, wherein the at least one specific recording element used for printing the pattern for detecting the positions is singular.

24. A head-shading method according to claim 14, wherein the at least one specific recording element used for printing the pattern for detecting the position is plural.

25. A head-shading method according to claim 24, wherein the at least one specific recording element includes respective recording elements at both ends of the recording head.

26. A head-shading method according to claim 25, wherein the at least one specific recording element further includes a recording element located at the center of the recording head.

27. A method of forming a head-shading pattern comprising the steps of:

printing a pattern for detecting uneven density using a recording head, the recording head having a plurality of recording elements arrayed thereon, and printing a pattern for detecting positions of recording elements correlated with the pattern for detecting uneven density using at least one specifically selected recording element of the plurality of recording elements, wherein the pattern for detecting the positions of the recording elements is recorded at a position for determining a relative position between the pattern for detecting uneven density and the recording elements used for printing the pattern for detecting uneven density.

28. A method of forming a head-shading pattern according to claim 27, wherein the at least one specific recording element used for printing the pattern for detecting the positions is singular.

29. A method of forming a head-shading pattern according to claim 27, wherein the at least one specific recording element used for printing the pattern for detecting the position is plural.

30. A method of forming a head-shading pattern according to claim 29, wherein the at least one specific recording element includes respective recording head at both ends of the recording element.

31. A method of forming a head-shading pattern according to claim 30, wherein the at least one specific recording element further includes a recording element located at the center of the recording head.

32. A method of preparing head-shading data comprising the steps of:

reading a pattern for detecting the positions of recording elements, the pattern being formed by the use of at least one recording element of plural recording elements of a recording head, and storing density data of the pattern in a memory, detecting an address of at least one specific recording element of the plural recording elements within the density data stored in the memory to have the address stored, reading a pattern for detecting uneven density, the pattern being formed by the use of all the recording elements of the recording head, and correlating density data on the pattern for detecting uneven density to each recording element of the plural recording elements according to the address location of the pattern for detecting the positions.

33. A method of preparing head-shading data according to claim 32, wherein the at least one specific recording element used for printing the pattern for detecting the positions is singular.

34. A method of preparing head-shading data according to claim 32, wherein the at least one specific recording element used for printing the pattern for detecting the positions is plural.

35. A method of preparing head-shading data according to claim 34, wherein the at least one specific recording element includes respective recording head at both ends of the recording element.

36. A method of preparing head-shading data according to claim 35, wherein the at least one specific recording element further includes a recording element located at the center of the recording head.

37. A recording apparatus having a head-shading function in correcting density data on each recording element by detecting the unevenness of a pattern formed by a recording head having a plurality of recording elements arrayed thereon, the recording apparatus comprising:

means for printing a pattern for detecting uneven density using the plurality of recording elements, means for printing a pattern for detecting the positions of the recording elements correlated with the pattern for detecting uneven density using at least one specifically selected recording element of the plurality of recording elements, means for detecting the density of the printed pattern for detecting uneven density, means for recognizing the position of the at least one specific recording element according to the printed pattern for detecting the positions, and means for correlating the density data on the pattern for detecting uneven density and each recording element of the plurality of recording elements according to the recognized position of the at least one specific recording element.

38. A recording apparatus according to claim 37, further comprising means for preparing head-shading data according to the density data correlated by the correlating means with each recording element of the plurality of recording elements.

39. A recording apparatus according to claim 38, further comprising means for correcting an image recorded by the recording head according to the head-shading data prepared by the means for preparing the head shading data.

40. A recording apparatus according to claim 37, wherein the recording head performs recording operations using different colors.

41. A recording apparatus according to claim 37, wherein the recording head ejects ink.

42. A recording apparatus according to claim 41, wherein the recording head utilizes thermal energy for ink ejection.

43. A recording apparatus according to claim 37, wherein the recording head performs recording operations by serial scanning.

44. A recording apparatus according to claim 43, wherein the pattern for detecting uneven density is formed after being scanned a plurality of times by the recording head.

45. A recording apparatus according to claim 37, wherein the recording head has a width equal to that of a recording medium.

46. A recording apparatus according to claim 37, wherein the at least one specific recording element used for printing the pattern for detecting the position is singular.

47. A recording apparatus according to claim 37, wherein the at least one specific recording element used for printing the pattern for detecting the position is plural.

48. A recording apparatus according to claim 47, wherein the at least one specific recording element includes respective recording elements at both ends of the recording head.

49. A recording apparatus according to claim 48, wherein the at least one specific recording element further includes a recording element located at the center of the recording head.

50. A head-shading method comprising the steps of:

printing a pattern for detecting uneven density using a recording head, the recording head having a plurality of recording elements arrayed thereon, printing a pattern for detecting the position of the recording elements correlated with the pattern for detecting uneven density using at least one specifically selected recording element of the plurality of recording elements, detecting the density of the printed pattern for detecting uneven density, recognizing the position of the at least one specific recording element according to the printed pattern for detecting the positions, and correlating the density data on the pattern for detecting uneven density and each recording element of the plurality of recording elements according to the recognized position of the at least one specific recording element.

51. A head-shading method according to claim 50, further comprising the step of preparing head-shading data according to the density data correlated in the correlating step with each recording element.

52. A head-shading method according to claim 51, further comprising the step of correcting an image recorded by the recording head according to the head-shading data prepared in the step of preparing the head-shading data.

53. A head-shading method according to claim 50, wherein the at least one specific recording element used for printing the pattern for detecting the positions is singular.

54. A head-shading method according to claim 50, wherein the at least one specific recording element used for printing the pattern for detecting the positions is plural.

55. A head-shading method according to claim 54, wherein the at least one specific recording element includes respective recording elements at both ends of the recording head.

56. A recording apparatus according to claim 55, wherein the at least one specific recording element further includes a recording element located at the center of the recording head.

* * * * *

UNITED STATES PATENT AND TRADEMARK OFFICE
CERTIFICATE OF CORRECTION

PATENT NO. : 5,552,810             Page 1 of 4
DATED      : September 3, 1996
INVENTOR(S): Takayuki MATSUO It is certified that error appears in the above-indentified patent and that said Letters Patent is hereby corrected as shown below:

COLUMN 1:

Line 22, "apparatus" should be deleted;
Line 24, "apparatus" should read --apparatuses--;
Line 25, "apparatuses" should read --apparatus--.

COLUMN 2:

Line 42, "respect" should read --respective--;
Line 67, "DTH" should read --$D_{TH}$--.

COLUMN 4:

Line 11, "head having" should read --head,-- and "head a" should read --head having a--.

UNITED STATES PATENT AND TRADEMARK OFFICE
CERTIFICATE OF CORRECTION

PATENT NO. : 5,552,810
DATED : September 3, 1996
INVENTOR(S) : Takayuki MATSUO

It is certified that error appears in the above-indentified patent and that said Letters Patent is hereby corrected as shown below:

COLUMN 6:

Line 11, "read read," should read --read,--.

COLUMN 9:

Line 40, "fail" should read --fails--;
Line 43, "orifice" should read --orifice.--.

COLUMN 10:

Line 2, "the these" should read --these--.

COLUMN 11:

Line 46, "Example" should read --Examples--;
Line 65, "colorinks," should read --color inks,--.

COLUMN 12:

Line 55, "now" should read --now be--;
Line 57, "intention" should read --invention--;
Line 58, "invention" should read --intention--.

UNITED STATES PATENT AND TRADEMARK OFFICE
CERTIFICATE OF CORRECTION

PATENT NO. : 5,552,810
DATED : September 3, 1996
INVENTOR(S) : Takayuki MATSUO

It is certified that error appears in the above-indentified patent and that said Letters Patent is hereby corrected as shown below:

COLUMN 13:

Line 42, "position" should read --positions--;
    Line 45, "position" should read --positions--.

COLUMN 14:

Line 9, "correlated the" should read --correlated in the-- and "with to" should read --with--;
    Line 38, "position" should read --positions--.

COLUMN 15:

Line 2, "position" should read --positions--;
    Line 5, "head" should read --elements--;
    Line 6, "element." should read --head.--;
    Line 39, "head" should read --elements--;
    Line 40, "element." should read --head.--.

UNITED STATES PATENT AND TRADEMARK OFFICE
CERTIFICATE OF CORRECTION

PATENT NO. : 5,552,810
DATED : September 3, 1996
INVENTOR(S) : Takayuki MATSUO

It is certified that error appears in the above-indentified patent and that said Letters Patent is hereby corrected as shown below:

COLUMN 16:

Line 9, "head shading" should read --head-shading--;
Line 26, "position" should read --positions--;
Line 29, "position" should read --positions--.

COLUMN 18:

Line 1, "A recording apparatus" should read --A head-shading method--.

Signed and Sealed this

Twenty-fifth Day of November, 1997

Attest:

BRUCE LEHMAN

Attesting Officer

Commissioner of Patents and Trademarks